UNITED STATES PATENT OFFICE.

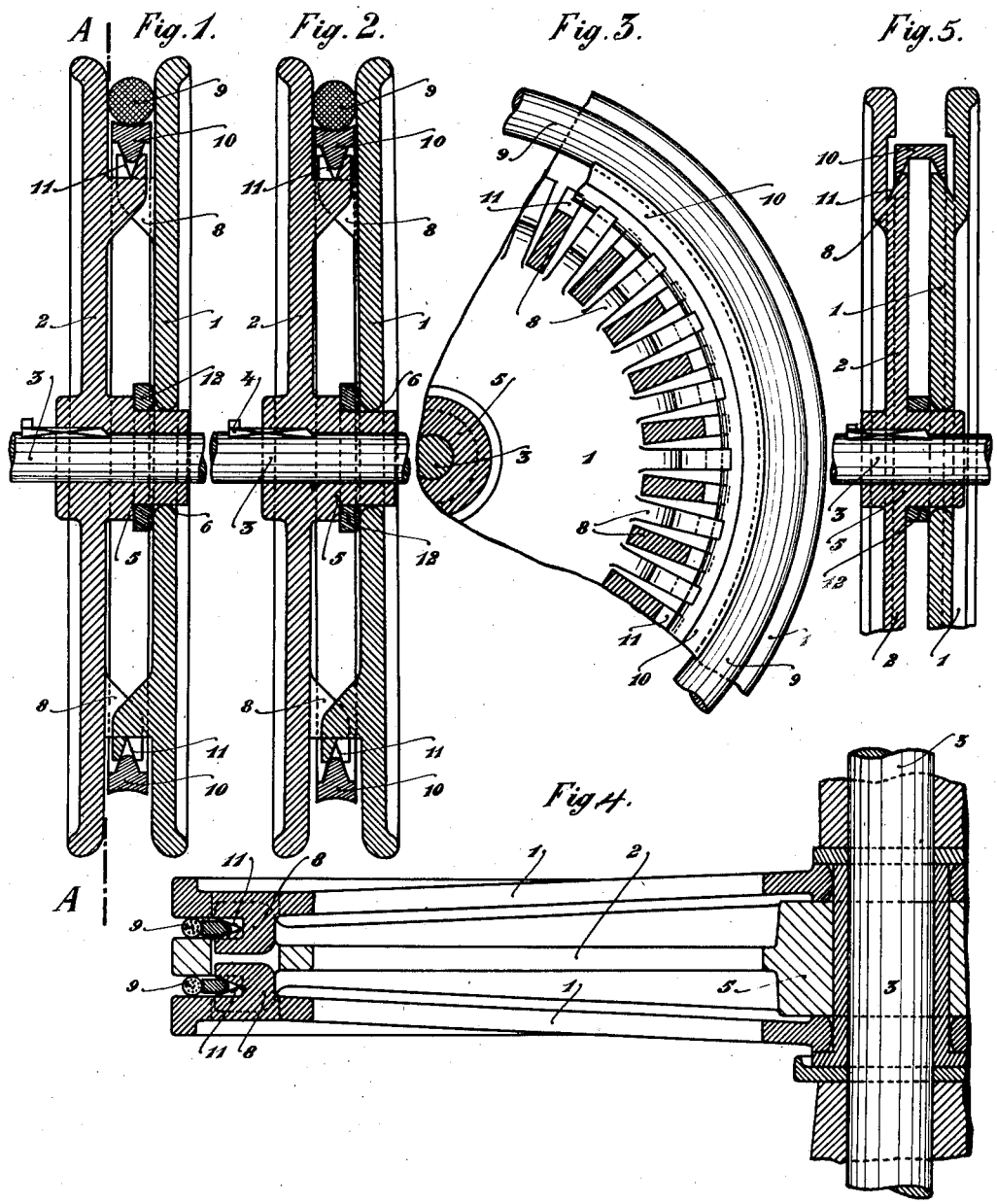

GUILLAUME BOLLEN, OF LIÈGE, BELGIUM.

PULLEY.

1,369,319.  Specification of Letters Patent.  Patented Feb. 22, 1921.

Application filed May 1, 1919. Serial No. 294,076.

*To all whom it may concern:*

Be it known that I, GUILLAUME BOLLEN, subject of the King of Belgium, residing at Liège, Belgium, have invented certain new and useful Improvements in Pulleys; and I do hereby declare the following to be a full, clear, and exact description of the invention.

The object of this invention is to provide a driving pulley or transmission pulley for belts of any thickness and of any material, such as hemp, leather, or metal, arranged so that the traction exerted by the belt at the pulley causes the pulley to exert a gripping action on that portion of the belt which runs in the notch of the pulley. In this way sliding of the belt relatively to the pulley is avoided and the gripping is automatic and increases in degree as the tension of the belt increases. The pulley is so designed that the belt enters freely into the notch and issues freely therefrom, the gripping ceasing at the place where the belt leaves the pulley. Consequently there is no tendency on the part of the belt to jump off of the pulley and the same runs with regularity.

The pulley comprises two substantially parallel plates assembled together, one of them at least being tiltable on the shaft which bears them, so that that plate can tilt relatively to the other plate. These plates bear inclined arms which cross and form the notch of the pulley and on these arms lies a belt supporting ring or movable rim. The degree of inclination of the inclined surfaces of the arms determines the effect of the pulley in producing the belt gripping force while this gripping effect is, at the same time limited by the supporting ring, whose breadth limits the relative movements of the plates toward each other. In the drawings are illustrated by way of example, several forms of the invention.

Figure 1 is a cross section through one form of pulley showing a belt in the notch thereof;

Fig. 2 is a similar view showing the belt gripped in the notch of the pulley, as when the belt is under tension;

Fig. 3 is a section on the line A—A of Fig. 1;

Fig. 4 is a radial section through a modified form of pulley; and

Fig. 5 is a section through a further modified form of pulley.

The pulley illustrated in Figs. 1, 2 and 3 comprises two disks 1 and 2 mounted on the shaft or axle 3, which may be either a drive or a driven shaft. The disk or plate 2 is secured to the axle 3 by a key 4, while the plate 1 is mounted upon the hub 5 of the plate 2 in such manner that it is movable longitudinally of the hub 5 and, its inner edge 6 being rounded, it is free to tilt through a slight angle in a plane perpendicular to plate 2. A ring 12 having a rounded face is mounted upon the hub 5 and bears against the plate 1 in such manner as to facilitate the tilting motion.

The plates 1 and 2 are each provided with a plurality of arms 8 around their periphery, the arms 8 of each plate extending toward the opposite plate, and having inclined faces, 11. The arms of plate 1 alternate with the arms of plate 2 when the pulley is assembled, as clearly shown in Fig. 3.

Arranged between the plates, and having a wedge shaped portion the sides of which rest upon the inclined surfaces 11 of the arms 8, is a ring or movable rim 10, the outer surface of which is adapted to serve as a seat for the belt 9. This ring 10 provides an uninterrupted seating surface for the belt.

When the belt 9 is under tension a considerable pressure is exerted on the ring 10, causing thereby the wedge shaped portion of the ring to exert pressure upon the oblique faces 11 of the arms 8 to draw the plates together on that side on which the belt lies and to separate them on the opposite side, as clearly shown in Fig. 2. In this position the belt 9 is squeezed laterally between plates 1 and 2 for about half the distance around the periphery of the pulley, while two plates separate at the place where the belt leaves the pulley and where it enters the notch of the pulley. The gripping effect is regulated by proportioning the width of the ring 10 to suit the particular belt. The ring 10, which limits the movement of plates 1 and 2 toward each other should have a width somewhat less than the diameter of the belt, as shown in Fig. 1, to insure the proper gripping effect.

The pulley shown in Fig. 4 comprises a fixed plate 2 and a tiltable plate 1 on each side thereof. The hub 5 of plate 2 forms the abutment limiting the movement of the inner edges of the plates 1 toward each other. Two notches are formed by the three plates, each of the notches containing a belt 9, the fixed plate 2 being provided with arms 8 having an oblique surface on either face coöperating with the corresponding arms or oblique surfaces of the two movable plates.

In the modification illustrated in Fig. 5 there are no crossed arms as in the other forms, the movable part 10 being provided in this case with an internal V-shaped groove the faces of which bear on the inclined faces 11 of the flanges 8. The pressure exerted by the belt on the ring 10 causes the member 10 to draw the plates 1 and 2 together to grip the belt in the same manner as described in connection with Figs. 1 to 4 inclusive.

It is obvious that still further modifications of the invention may be made and I do not limit myself therefore to the exact form shown and described.

Having thus described the invention what is claimed as new and desired to be secured by Letters Patent is:—

1. In a pulley, in combination, a supporting axle, two members mounted on said axle and rotatable therewith, one member being rigidly secured to the axle and the other member being tiltable relatively to the first member, said members being adapted to frictionally grip a belt between them, and having oppositely facing inclined surfaces, and means interposed between said members and bearing on said inclined surfaces, said means being adapted to support a belt and to act upon the inclined surfaces due to the belt pressure, to cause the gripping members to coact to frictionally engage the same.

2. In a pulley, in combination, a supporting axle, two members mounted on said axle, one member being held in a plane at right angles to the axis of the axle and the other member being tiltable relatively thereto, the tiltable member being mounted on the hub of the first member, said members being adapted to frictionally grip a belt between them and having oppositely facing inclined surfaces, and means interposed between said members and bearing on said inclined surfaces, said means being adapted to support a belt and to act upon the inclined surfaces due to the belt pressure, to cause the gripping members to coact to frictionally engage the same.

3. In a pulley, in combination, a supporting axle, two circular members mounted on said axle, said members being adapted to frictionally grip a belt between them, and each member having a plurality of arms extending toward the other member, the arms of each member having inclined surfaces facing away from the other member, and a ring interposed between said members and bearing on the inclined surfaces of the arms, said ring being adapted to support a belt and to act upon the inclined surfaces, due to the belt pressure, to cause the gripping members to coact to frictionally engage the same.

4. In a pulley, in combination, a supporting shaft and two members mounted on said shaft one of said members having its hub rigidly attached to the shaft and the second member being tiltable with respect to the first member, a ring positioned on the hub of the member fixed to the shaft, said ring comprising a stop limiting the movement of the tiltable member toward the other member and comprising the axis about which the tiltable member may be tilted, the two members being attached to frictionally engage a belt between them and being provided with surfaces inclined in opposite directions, and a device between said members which bears against said inclined surfaces, said device being adapted to carry a cable and to act on the inclined surfaces due to the pressure of the cable in such manner as to cause the members to grip the cable between them.

In testimony whereof I affix my signature in presence of two witnesses.

GUILLAUME BOLLEN.

Witnesses:
  O. GOTTSCHALK,
  A. NOTTEN.